United States Patent [19]

Kunizawa et al.

[11] Patent Number: 4,964,167

[45] Date of Patent: Oct. 16, 1990

[54] APPARATUS FOR GENERATING SYNTHESIZED VOICE FROM TEXT

[75] Inventors: Hiroharu Kunizawa; Noboru Ueji; Akira Yamamura; Hiroshi Itoyama, all of Kadoma, Japan

[73] Assignee: Matsushita Electric Works, Ltd., Japan

[21] Appl. No.: 216,210

[22] Filed: Jul. 6, 1988

[30] Foreign Application Priority Data

Jul. 15, 1987 [JP] Japan .................................. 62-176258
Oct. 19, 1987 [JP] Japan .................................. 62-263298
Oct. 19, 1987 [JP] Japan .................................. 62-263299

[51] Int. Cl.⁵ ............................................. G10L 5/04
[52] U.S. Cl. ..................................................... 381/52
[58] Field of Search .................... 381/51–53; 364/513, 5; 235/462–467, 472; 434/116, 185

[56] References Cited

U.S. PATENT DOCUMENTS

| | | | |
|---|---|---|---|
| 3,978,318 | 8/1976 | Romeo et al. | 235/472 |
| 4,337,375 | 6/1982 | Freeman | 179/1 |
| 4,398,059 | 8/1983 | Lin et al. | 179/1 |
| 4,457,719 | 7/1984 | Dittakavi et al. | 434/159 |
| 4,466,801 | 8/1984 | Dittakavi et al. | 434/335 |
| 4,505,682 | 3/1985 | Thompson | 434/335 |
| 4,549,867 | 10/1985 | Dittakavi | 434/337 |
| 4,602,152 | 7/1986 | Dittakavi | 381/52 |
| 4,692,941 | 9/1987 | Jacks et al. | 381/52 |
| 4,766,299 | 8/1988 | Tierney et al. | 235/462 |
| 4,797,930 | 1/1989 | Goudie | 381/52 |

OTHER PUBLICATIONS

Mitsubishi, Melcard Advertising Brochure, 1/16/88.

*Primary Examiner*—Gary V. Harkcom
*Assistant Examiner*—John A. Merecki
*Attorney, Agent, or Firm*—Leydig, Voit & Mayer

[57] ABSTRACT

An apparatus for generating synthesized voice from a bar code includes a voice encoding unit of a voice data input unit, a composition data analyzer, and an analyzed information library arranged independent of a voice response unit of a control information generator and voice composer. Analyzed information is written into the information store means in the voice encoding unit.

14 Claims, 12 Drawing Sheets

※ JAPANESE LANGUAGE

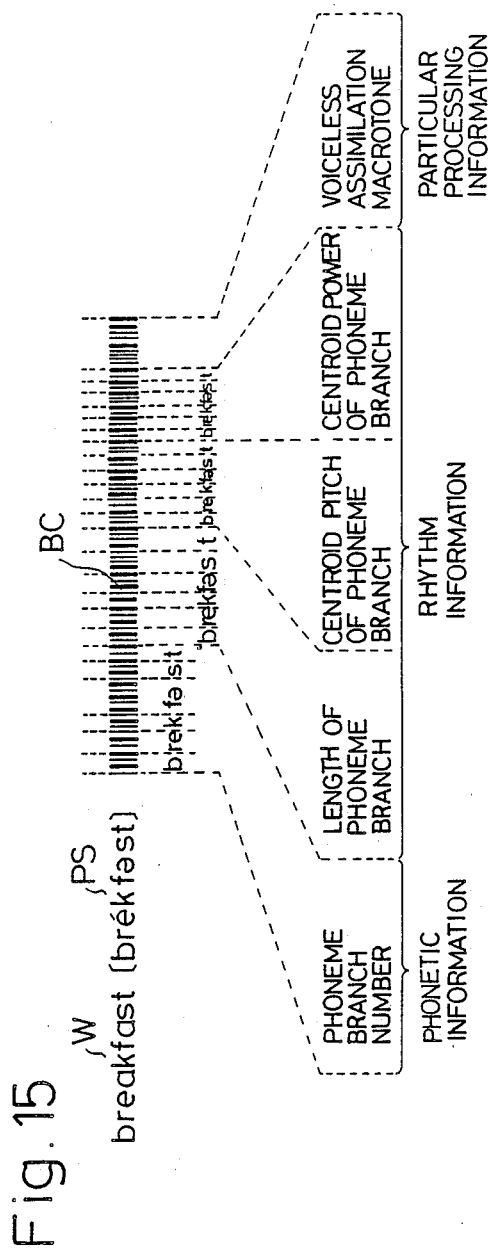

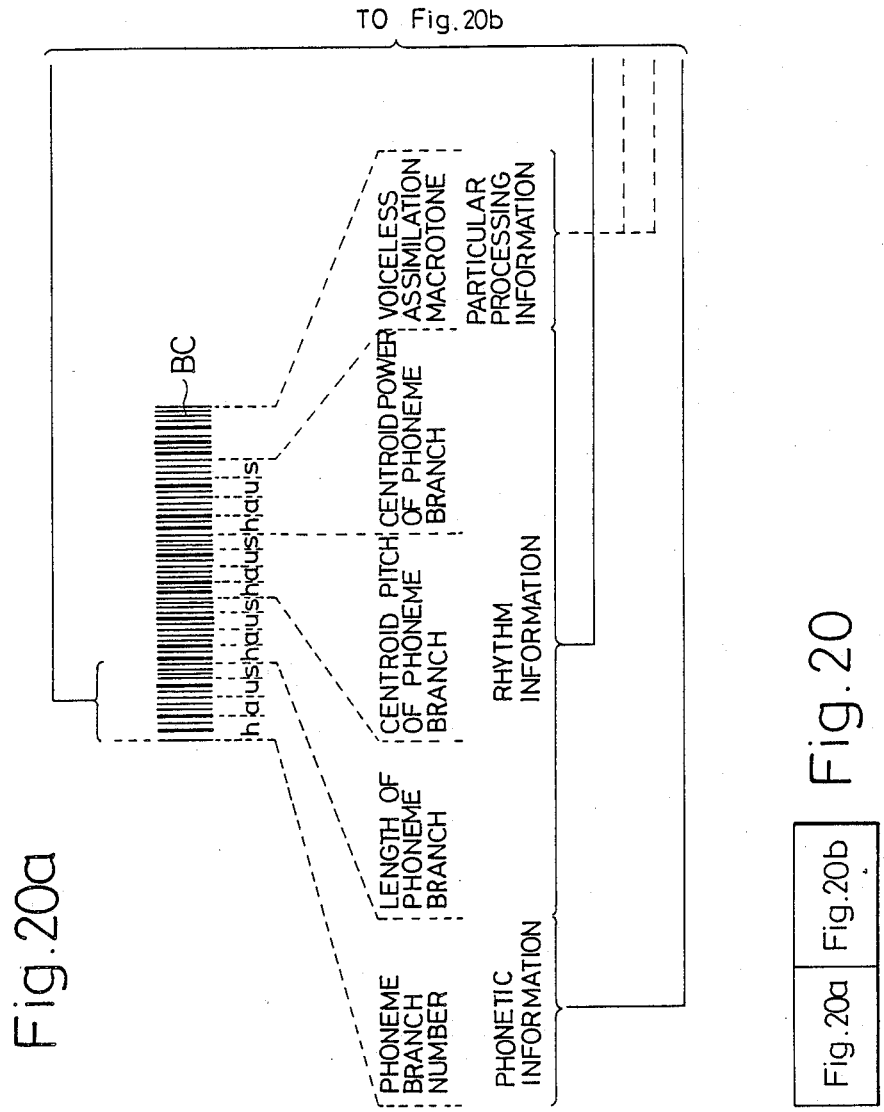

APPARATUS FOR GENERATING SYNTHESIZED VOICE FROM TEXT

TECHNICAL BACKGROUND OF THE INVENTION

This invention relates to voice encoding, composing systems and, more particularly, to systems which prepare voice data for writing them in bar codes or the like as information storing elements so as to be effectively applicable to voice response equipment.

The voice encoding, composing system of the kind referred to may be effectively employed in, for example, voice or speech learning devices, particularly, language dictionaries with voiced term display function, commodity-discriminating means for use by weak-sighted and blind people, and so on.

DISCLOSURE OF PRIOR ART

Computer controlled systems have employed voice response equipment functioning as a terminal unit providing an interface between computers and human beings. The voice response equipment are so arranged that voice output data to be utilized as voice response are stored, and a voice responsive to a service request is prepared on the basis of the stored data to be provided as a voice output. In this case, an incorporation of a memory means in the voice response equipment renders required devices for realizing the composing system likely to become larger in size since the required memory capacity is large in spite of a small input information amount available.

In applying the voice response equipment of the learning devices or the like, it is desired that the equipment is prepared in a smaller size and at a lower cost since the equipment is to be utilized by individual trainees. Stored voice data is encoded into a form capable of being processed for the voice composition system. Voice composing processes may be classified as either regularly composing, recording or editing, and parameter editing processes, respective characteristics of which are shown in Table I:

TABLE 1

| Characteristics | Regularly Comp. | Rec. & Edit. | Parameter Edit. |
|---|---|---|---|
| Tone Quality Understandability: | medium | high | high |
| Tone Quality Naturalness: | low | high | medium |
| Information Amount: | 50-75 bps | 24-64 bps | 2.4-9.6 kbps |

As will be clear from the above Table I, the regularly composing process is lower in the tone quality (the understandability and naturalness) than the other two processes, but is extremely high in the information compression rate so as to be highly adaptable to the small and inexpensive voice response equipment.

The regularly composing process prepares pronouncing voices from such text data as a character array of a word or the like text (the array being employed as phonetic information) and such rhythm information as accentuation, intonation phonetic length, and the like of the text, on the basis of phonetic and linguistic rules. In particular, a process of preparing voices only from the text data phonetic information on phonemes of the text (character array) is called a text composing process, which may be regarded as an ultimate aspect of the voice composing system that has stepped even into intellectual faculties of human voice. The text composing process has been discussed in, for example, an article titled "Conversion of unrestricted English text to voice" (MIT), MJTALK-79, published 1979.

The text composing process comprises generally a composition analysis part which produces the phonetic information and such rhythm information as the accent, intonation, phonetic length and the like with respect to input text data with a linguistic dictionary or the like, a control information generating part which generates control information by means of the information prepared by the composition analysis part, and a voice composition part which composes voice information on the basis of the control information. With this arrangement, however, there arises a problem that, since there is frequently a large quantity of rhythm information, a section in the composition analysis part for generating the rhythm information requires a large capacity so that the voice composition part prepared corresponding to the analysis part employing the particular process has to be large in size.

In order to render the regularly composing process optimumly utilizable as a learning device or the like with voice encoding unit and voice response unit divided independently of each other, there have been suggested various measures for simplifying the entire system by modifying the voice encoding unit to utilize a bar code as disclosed in, for example, U.S. Pat. No. 4,337,375 to Alfred B. Freeman, U.S. Pat. No. 4,398,059 to Kun-Shan Lin et al, U.S. Pat. No. 4,457,719 to Ashok Dittakavi et al. The measures according to these U.S. Patents are effective to achieve the intended minimization in size and weight as well of the composing system so as to render it useful when employed as the learning devices. However, there still remains a problem that the bar code employed as the information storing means for the voice encoding unit in these known measures still requires for its preparation an interposition of human work so that the preparation will be extremely complicated and difficult to fully automate while the information storing means can be remarkably minimized in size.

TECHNICAL FIELD OF THE INVENTION

A primary object of the present invention is, therefore, to provide a voice encoding, composing system which is capable of simplifying to a large extent the preparing work for the information storing means, keeping thus the compactness of the entire system, and providing excellent ease of handling when applied to the learning device and the like.

According to the present invention, this object can be realized by providing a voice encoding, composing system in which text data (character array) of a work or the like text from a text data input means are provided as inputs to a composition analysis means which generates phonemic information and rhythm information on the text, this information generated by the composition analysis means are provided as inputs to a store means to be once stored therein, the stored information are provided as inputs to means for generating control information, and a voice composition means composes in response to the control information voice information to be provided as a voice output wherein the data input means and composition analysis means are incorporated as a voice encoding unit separately from a voice response unit including the control information generating means and voice composition means, and in the voice encoding unit the information provided by the composition analysis means is loaded by a writing means into the store means.

Other objects and advantages of the present invention shall be made clear in following description of the invention detailed with reference to embodiments shown in accompanying drawings.

BRIEF EXPLANATION OF THE DRAWINGS

FIGS. 12 to 15 and 16(a) to 16(d) are schematic explanatory views for a language dictionary assembly according to the system of the present invention;

While the present invention shall now be explained with reference to the embodiments shown in the accompanying drawings, it should be appreciated that the intention is not to limit the invention only to these embodiments but rather to include all alterations, modifications and equivalent arrangements possible within the scope of appended claims.

DISCLOSURE OF PREFERRED EMBODIMENTS

Figure 1:
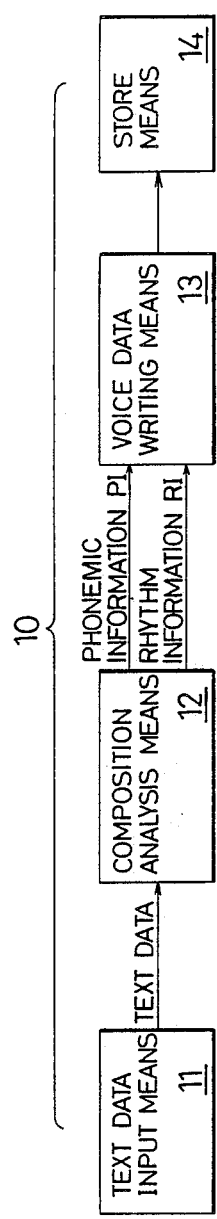
FIG. 1 shows in a block diagram a voice encoding unit in the voice encoding, composing system according to the present invention.
Figure 2:
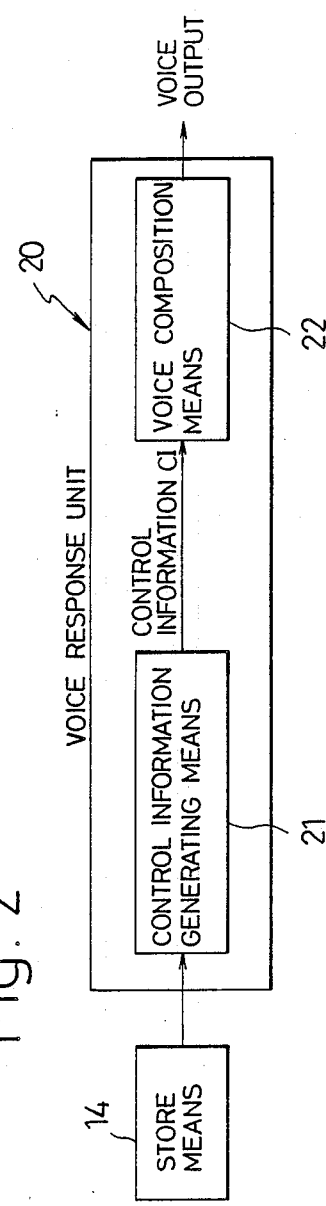
FIG. 2 shows also in a block diagram a voice response unit in the voice encoding, composing system of the present invention.

Referring to FIGS. 1 and 2 showing a voice encoding, composing system according to the present invention, FIG. 1 shows a voice encoding unit 10 and FIG. 2 shows whereas a voice response unit 20. According to a remarkable feature of the present invention, these voice encoding unit 10 and voice response unit 20 are provided to be independent of each other.

The voice encoding unit 10 comprises a text data input means 11 which receives, as inputs, basic data for composing a word or the like text and provides text data, a composition analysis means 12 receiving the text data and providing as outputs rhythm information RI and phonemic information PI, a writing means 13 receiving the rhythm and phonemic information RI and PI, encoding them as voice data and carrying out a writing operation of the encoded voice data, and an a store means 14 into which the encoded voice data are written by the writing means 13.

On the other hand, the voice response unit 20 comprises a control information generating means 21 which includes a reader means (not shown) for the voice data encoded on the store means 14 and decodes the data read out into the rhythm and phonemic information RI and PI to prepare from these decoded information a control information CI, and a voice composition means 22 connected to the CI generating means 21 for composing voice signals on the basis of the control information CI, the signal being provided out of the voice composition means 22 as a voice output.

According to this system of the present invention, the voice response unit 20 made independent of the voice encoding unit 10 does not include any composition analysis means which is likely to become relatively large in capacity, and the unit can be minimized in size and weight so that, when the present system is employed as learning equipment, the voice response unit 20 may be disposed on user side for each of handling.

In addition, for the store means 14, an integrated circuit (IC) card or bar code on which the voice data encoded may be loaded can be employed so that, in contrast to conventional bar code required to be manually prepared, the store means 14 consisting of the bar code or the like can be adapted to mass production.

Figure 3:
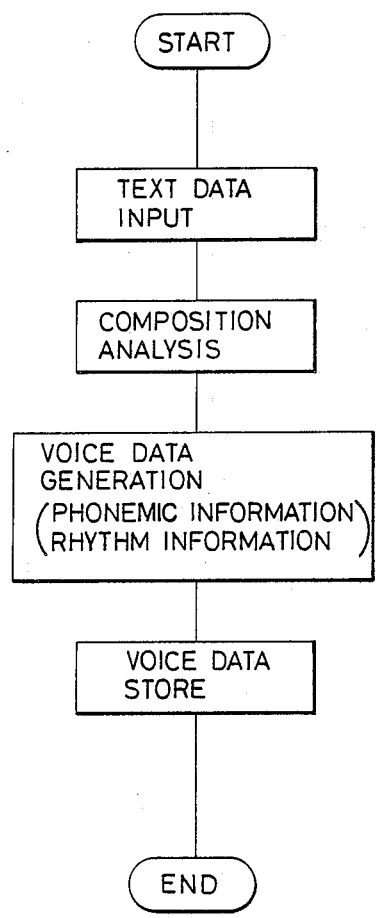
FIG. 3 is a flow-chart for explaining the operation of the voice encoding unit of FIG. 1.

Referring in more detail to, the voice encoding unit 10 with reference to FIG. 3, an array of characters forming a word or sentence is given as text data input by means of such text data input means 11 as a keyboard or the like, to start with. At the composition analysis means 12, the text data are converted into voice data consisting of the rhythm information RI (accent, intonation, pause, voice level, phonological duration and the like) and phonemic information PI (which shows the order of composing unit for the voice composition) in any known manner based on the language dictionary or other rule. The voice data are further encoded by the writing means 13 and are thereafter written into the store means 14. At the writing means 13, the data may be binary coded and an IC card may be employed as the store means 14. In an optimum working aspect of the invention, the encoding is carried out at the writing means 13 as the bar code, in other words, the store means 14 is formed as the bar code which can be written in particular even on papers as the voice data by a printing on a large scale, whereby the store means 14 can be adapted to automatic preparation and highly to the mass production, as will be readily appreciated. When the bar code is employed as the store means 14, it is made possible that users can randomly access the means so as to be highly adaptable to learning equipment.

In preparing the bar code, further, it will be optimum that binary indicated and series connected voice data are divided at every odd number bit predetermined, the bar code is prepared on the basis of a table in which the data divided as above and $2^{2n-1}-1$ codes in $(2^n-2)\times(2^n-2)$ variations in which all "1" or all "0"

code array are removed from codes with respect to n bars made to be of logical values "1" and "0" depending on whether they are wide and narrow as well as codes with respect to n spaces are disposed to correspond to each other, and a narrow bar is added to a termination of the thus prepared bar code.

Figure 4:
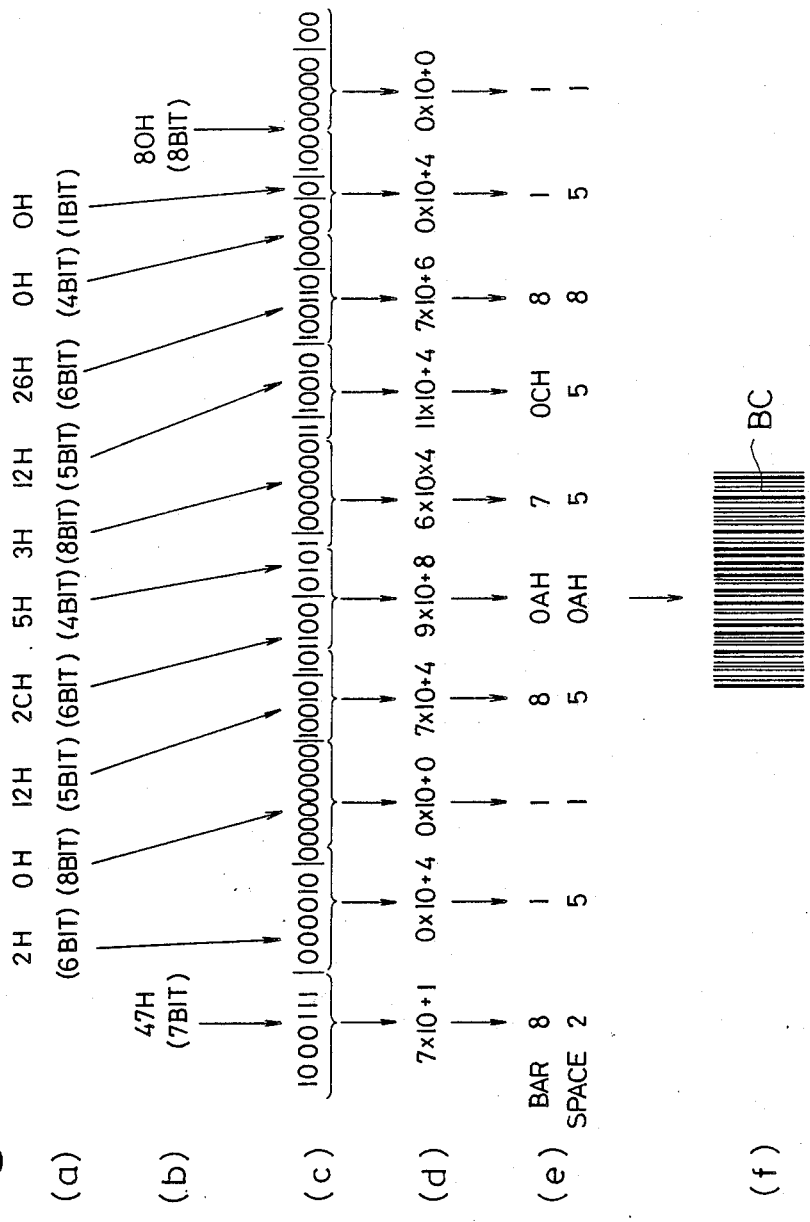
FIG. 4(a) -4(f) is an explanatory diagram for a preparation of bar code as the information store means in FIG. 1.

Referring more specifically to the above by reference to FIG. 4, it should be now assumed that input voice data as shown by a portion (a) of FIG. 4 in the drawing consist of 2H (6bits), 0H (8 bits), 12H (5 bits), 2CH (6 bits), 5H (4 bits), 3H (8 bits), 12H (5 bits), 26H (6 bits), 0H (4 bits) and 0H (1 bit). A start code 47H (7 bits) is added to top position of the input data, and lower positioned 8 bits of a sum value with all code assumed as 8 bit data are added to terminating position, as check-sum code - 80H (8 bits), as shown in portion (b) of FIG. 4.

These input data, start code and check-sum code are modified to such binary indication and series connected as shown in portion (c) of FIG. 4. In this case, further 2 bits are added to the terminating position so that they may be divided at every $(2n-1)$ bits, that is, every odd number bits as 7 bits as shown in the drawing. The respective 7 bit data thus divided are then converted into such form of $10a_i + b_i$ as shown in portion (d) of the drawing, in which event such binary data as in following Table II preliminarily prepared are employed as $a_i$ and $b_i$:

TABLE II

| $a_i$ | Bar Data (0 0 0 0) | $b_i$ | Space Data (0 0 0 0) |
|---|---|---|---|
| 0 | 0 0 0 1 | 0 | 0 0 0 1 |
| 1 | 0 0 1 0 | 1 | 0 0 1 0 |
| 2 | 0 0 1 1 | 2 | 0 0 1 1 |
| 3 | 0 1 0 0 | 3 | 0 1 0 0 |
| 4 | 0 1 0 1 | 4 | 0 1 0 1 |
| 5 | 0 1 1 0 | 5 | 0 1 1 0 |
| 6 | 0 1 1 1 |   | (0 1 1 1) |
| 7 | 1 0 0 0 | 6 | 1 0 0 0 |
| 8 | 1 0 0 1 | 7 | 1 0 0 1 |
| 9 | 1 0 1 0 | 8 | 1 0 1 0 |
| 10 | 1 0 1 1 |   | (1 0 1 1) |
| 11 | 1 1 0 0 | 9 | 1 1 0 0 |
| 12 | 1 1 0 1 |   | (1 1 0 1) |
|   | (1 1 1 0) |   | (1 1 1 0) |
|   | (1 1 1 1) |   | (1 1 1 1) |

The bars and spaces are thereby made as shown in portion (e) in FIG. 4, and a bar code BC written on the basis thereof will be as in portion (f) of the drawing. Here, a narrow bar is added to the terminating position so that the width of the last positioned bar may be positively discriminated, and the above conversion Table is so prepared that all "0" or "1" data may not be employed while the number of "1", that is, wide bars and wide spaces will be smaller, as will be readily appreciated.

The bar code BC shown in FIG. 4 may be made followable to varying scanning speed by so arranging the bars and spaces that, when they are divided into groups of four from the top positioned bar, at least one of them will be a narrow element and another will be a wide element, and threshold values of the wide and narrow bars and spaces are set with respect to each unit including four bars and four spaces. Further, it is made possible to represent seven bit data with a total of eight of the bars and spaces, i.e., 8 bits (representing 130 variations with 13 variations of $a_i$ and 10 variations of $b_i$), and a remarkably higher storing density can be provided to the bar code than that of any known bar code.

Figure 5:
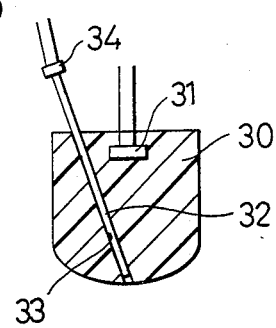
FIG. 5 shows in a schematic sectioned view a sensor in a practical working aspect to be employed as a reader of the voice response unit, in FIG. 2.

According to another remarkable feature of the present invention, the control information generating means 21 in the voice response unit 20 employs a unique sensor in a reader means included in the means 21, the sensor allowing required number of parts for the reader means to be reduced. Referring to FIG. 5, the sensor comprises a lens 30 and a light emitting element 31 embedded in upper part of the lens 30. For this light emitting element 31, a light emitting diode is employed, and a plastic-made convex lens or, if required, a lens having a light emitting diode available in the market may be employed as the lens 30. An optical fiber 32 is passed through a hole 33 made in the lens so that a tip end of the optical fiber 32 will reach the lower surface of the lens 30, that is, convex surface on light radiating side of the lens. In other words, the convex surface of the lens 30 is to be the closest surface of the reader means to the bar code forming the store means in the above embodiment, and the optical fiber extends to be at the closest surface upon operation of the reader means, while the tip end of the fiber 32 will be at a position, preferably, slightly retracted inward from the convex surface of the lens. The hole 33 should preferably be formed rather simultaneously with mold-forming of the lens 30 than to be formed by a drilling or the like. At the other rear end of the optical fiber 32, there is provided a light receiving element 34 of a phototransistor or the like.

Figure 6:
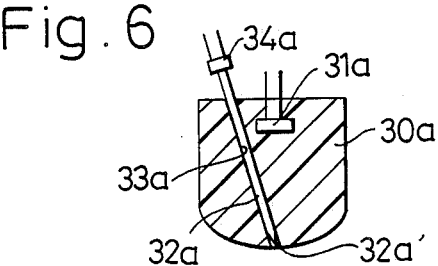

When the light emitting element 31 emits light in the sensor of the above embodiment, the emitted light is caused to be condensed by the lens 30 and to be incident upon the bar code, and reflected light from the bar code is made incident on the light receiving element 34 as transmitted through the optical fiber 32. In this arrangement, the integral assembly of the lens 30, light emitting element 31 and optical fiber 32 allows the sensor to be easily positioned with respect to the bar code without requiring positionings between the respective members and with respect to the bar code, in contrast to any known sensors in which the members are mutually independent, and required number of parts can be reduced from three to one, so that the arrangement will be effectively contributive to the improvement in the productivity. Another embodiment of the sensor is shown in FIG. 6, in which the tip end of the optical fiber 32a is sharpened to be a tapered end 32a'. With the provision of this tapered end 32a', it is made possible to render a lead-in area rate for the reflected light at the tip end of the optical fiber 32a to be larger than that in the case of FIG. 5, and to eventually elevate the gain at an amplifying circuit for an output of the light receiving element 34a. In FIG. 6, the same constituents as in FIG. 5 are denoted by the same reference numerals but with a suffix "a" added, and other arrangement and operation are substantially the same as those in FIG. 5.

Figure 7:
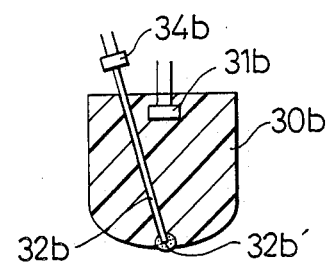
FIGS. 6 to 8 are similar sectioned views of other aspects respectively, of the sensor.

In still another embodiment of the sensor as shown in FIG. 7, a hard bead 32b' is attached to tip end of an optical fiber 32b so that the bead will be positioned at the convex surface of a lens 30b. This bead 32b' is made of glass or other suitable material, and the tip end of the optical fiber 32b is inserted into a hole made in the center of the bead 32b', preferably. With this arrangement, sliding scanning of the sensor along the bar code is made smooth by the bead 32b', and the using easiness can be improved, while the bead can be effectively protect a surface of the optical system employed here. In FIG. 7, the same constituents as in FIG. 5 are denoted by the same reference numerals but with a suffix "b" added, and other arrangement and operation are substantially the same as those in the case of FIG. 5.

Figure 8:
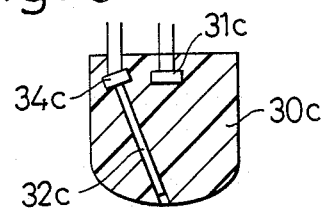

In a further embodiment of the sensor shown in FIG. 8, a light receiving element 34c coupled to the rear end of an optical fiber 32c is also embedded in upper part of a lens 30c, so as to render the sensor to be further intensively arranged to be compact. In FIG. 8, the same constituents as those in FIG. 5 are denoted by the same reference numerals but with a suffix "c" added, and other arrangement and operation are substantially the same as those in FIG. 5.

Figure 9:
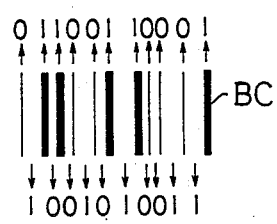
FIGS. 9 to 11 are explanatory views for the operation of the reader means according to the present invention.
Figure 11:
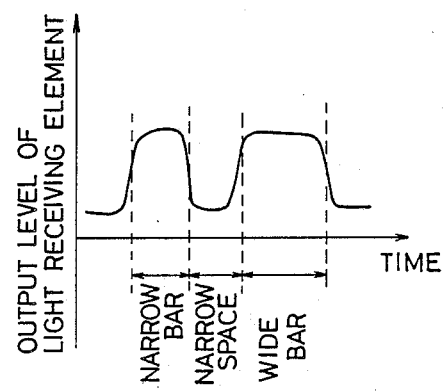
Figure 10:
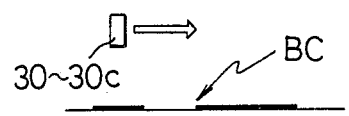

Such sensors 30–30c as has been disclosed above are employed respectively to scan the bar code BC such as shown in FIG. 9, in practice, to have an output provided out of the light receiving elements 34—34c in response to the wide and narrow arrangement of the bars and spaces as will be clear from FIGS. 10 and 11.

Figure 12:
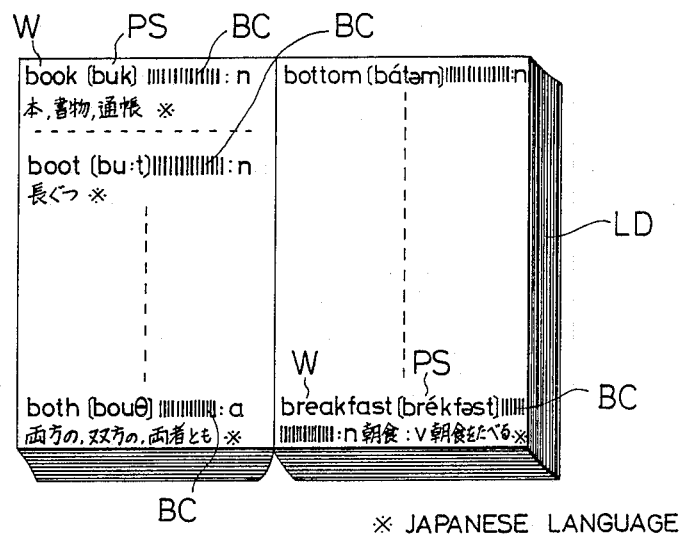
Figure 13:
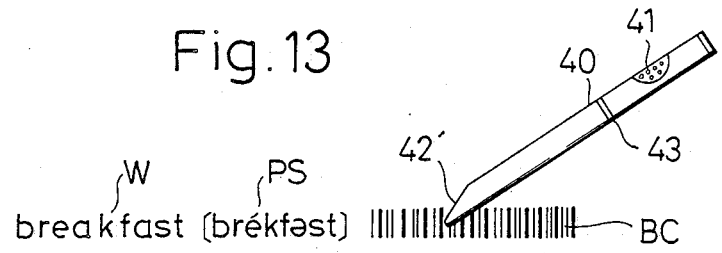
Figure 14:
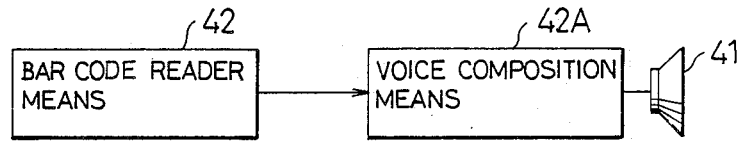

According to still another remarkable feature of the present invention, the voice encoding and composing system can be used as a learning device, in particular, as an assembly in an aspect of a voicing language dictionary. Referring here to FIGS. 12 to 14, the language dictionary assembly comprises a language dictionary LD as the means for storing and reader means 40 as the voice response unit, and, in the present instance, the language dictionary LD includes words W of a language, their phonetic signs PS and corresponding words in another language, as well as bar codes BC prepared in the manner described with reference to FIGS. 1 to 4 for the respective words voices, as printed for every word W. Here, the bar code BC should be of digitalized voice information so that a voice of the word W pronounced may be reproduced through a voice composition in accordance with the regularly composing process. That is, as shown in FIG. 15, the bar code BC should optimally include the phonetic information consisting of phoneme branch numbers of the voiced word, the rhythm information consisting of length of phoneme branches, centroid pitch of the phoneme branches and centroid power of the phoneme branches of the word voiced, and particular processing information on voiceless, assimilation and macrotone nature of the word. In order to improve tone quality of reproduced voice of the word, it is preferable that the bar code BC contain a large amount of information in respect of, in particular, the length centroid pitch and centroid power of the phoneme branches forming the rhythm information on the word.

Preferably, a reader means 40 for the bar code is provided in, for example, a pen type to be easily held in a user's hand, and a small loudspeaker 41 is incorporated in the pen-type reader means 40 so that the voice output will be provided to the loudspeaker 41 through a bar-code reader means 42 and voice composition means 42A also incorporated in the reader means 40. A switch 43 for connecting and disconnecting an electric power source desirably provided in the reader means 40 is provided at such proper position as central part of the pen-type reader means 40.

When the user looks up one of the words W in the dictionary LD employed and wants to learn the pronunciation of the word, the switch 43 of the reader means 40 is turned on, a given bar code BC for the scanned by the sensor 42′ of the reader means 40, then the voice information of the bar code is read out by the bar code reader means 42 including the sensor 42′, and the read-out output of the information is provided to the voice composition means 42A. The voice information provided to the voice composition means 42A is processed for sequential reading of a character array of the word W as shown in FIG. 16(a) on the basis of the phoneme branch number given in the bar code. For the phoneme branch, formant parameter or PARCOR parameter of analysis and composition system may be employed. As shown in FIG. 16 (b) and 16(c), next, the respective phoneme branches are compressed or expanded in accordance with their duration and amplitude and are thereafter coupled in accordance with a predetermined rule so as to be in a so-called composition unit array, they are further subjected to the voice composition by means of the regularly composing process in relation to basic frequencies of the respective phoneme branches, and such voice signal as shown in FIG. 16 (d) and having given accent and intonation in the bar code of the phonetic sign is composed and reproduced through the loudspeaker 41.

Figure 17:
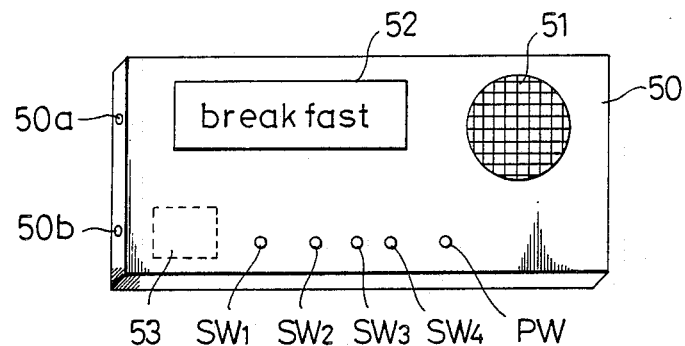
FIG. 17 is an explanatory view of another reader means in the present invention.

As the voice response unit, it may be possible to provide the unit in a flat shape equipment, such as a reader means 50 shown in FIG. 17, provided in front side face with a loudspeaker 51 and a spell display means 52. For the display of a spelled word, the bar code BC may be prepared to further include spell information which comprises alphabetic numbers, whereby the user listens to the reproduced pronunciation of a selected word while observing the spelling of the same word at a sufficiently closer position to the user's face for easy and clear listening and observation. The reader means 50 may properly be provided further with connection terminals 50a and 50b for a separate sensor (not shown), earphone and the like, store means 53, and various switches PW, SW1, SW2, ... for power source connecting and disconnecting, reader operating and the like purposes.

Figure 18:
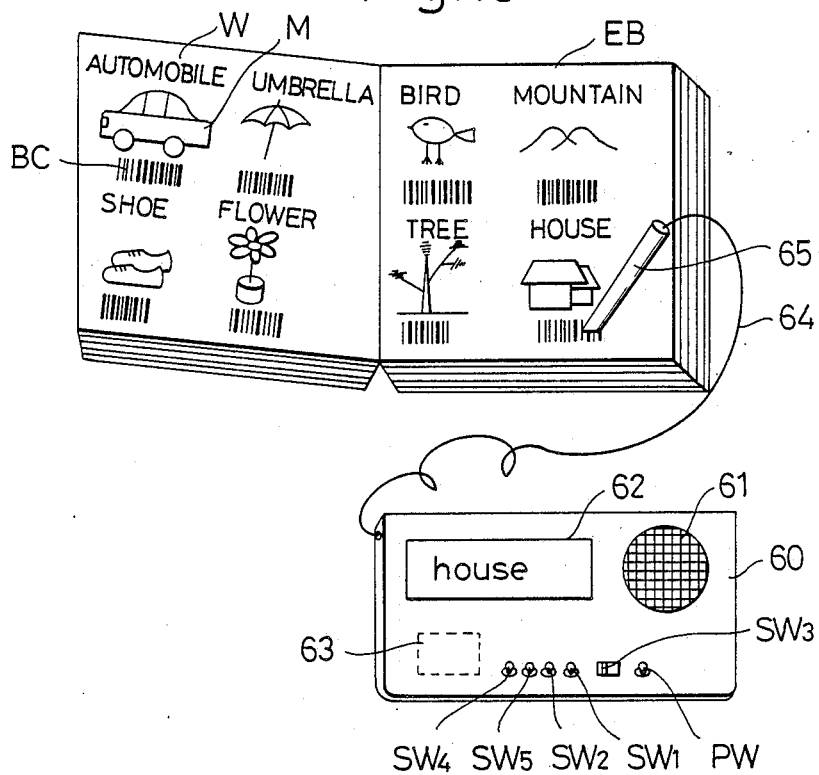
FIG. 18 is an explanatory view of a learning assembly according to the present invention.

According to further another remarkable feature of the present invention, the system can be employed as a learning equipment suitable for use with children. Referring to FIG. 18, the learning equipment includes a picture-book like text book EB which forms the voice encoding unit, and a reader means 60 forming the voice response unit and similar to the reader means 50 shown in FIG. 17. In the text book EB, there are printed concurrently model figures M, corresponding words W and also corresponding voice-information bar codes BC. In preparing these bar codes BC, substantially the same process as has been described with reference to FIGS. 1-4 and to FIGS. 12-16 may be employed. The reader means 60 is formed in a flat shape, and is provided with a loudspeaker 61 and word display 62, together with a required store means 63 incorporated in body housing. A pen-type sensor 65 is connected through a cable 64 to the reader means for scanning the bar codes BC, and power source connecting and disconnecting switch PW and respective switches SW1–SW5 for operating respective means as will be detailed in the following are provided also to the reader means 60.

Figure 19:
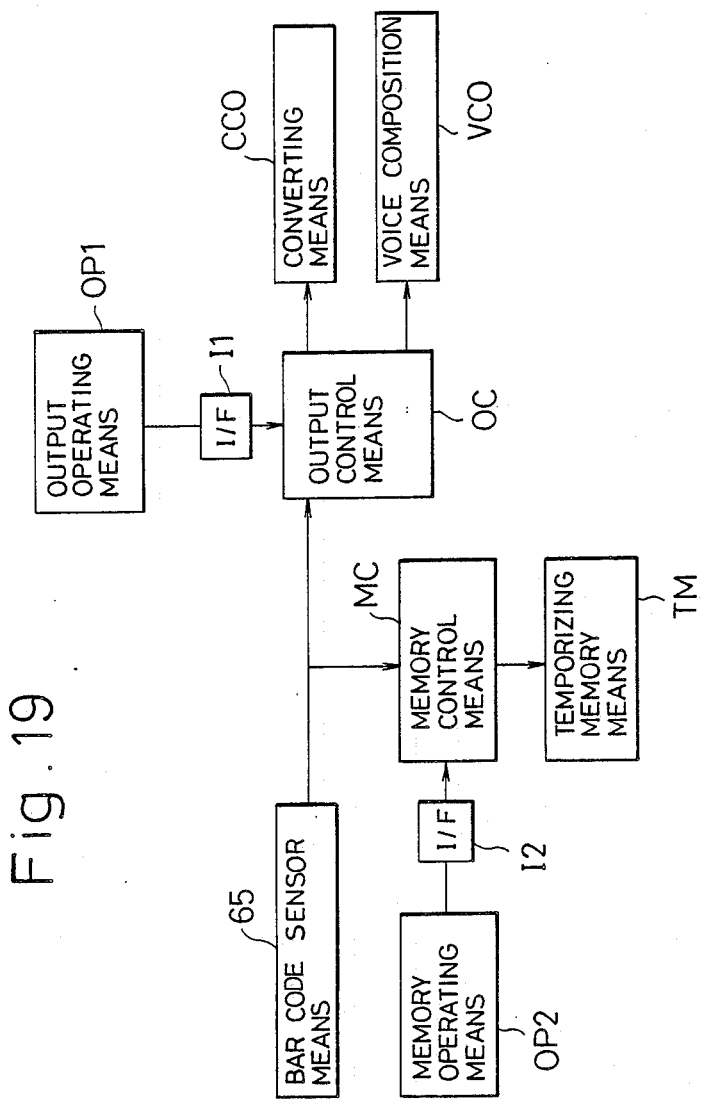
FIG. 19 is a block diagram of the learning assembly of FIG. 18.

Referring more specifically to the reader means 60 by references to FIG. 19, the voice information of the bar code BC is read out by the pen-type sensor 65 and is provided as inputs to an output control means OC which acts to control a voice composition means VCO and converting means CCO, the voice composition means VCO composes the voice signals on the basis of the regularly composing process to have them reproduced through the loudspeaker 61, and the converting means CCO converts, for example, a printing type display of a word corresponding to a selected figure M in the input information into a script type display, one of a plurality of characters present for one word into another character, or a native language word into a foreign language word for displaying at the display means 62. The output control means OC is also operated, through an interface Il, by an output operating means OP1 which has the switch SW1 for voice output operation, switch SW2 for display output operation and output mode switch SW3, and in practice ON and OFF operations of the voice output, converting operation or display output will be carried out by means of these switches SW1-SW3.

Further, the voice information read out by the sensor means 65 is also being provided to a memory control means MC which is operated through an interface I2 by a memory operating means OP2 to provide an output to a temporary memory means TM. In this case, preferably, the memory operating means OP2 includes the switch SW4 for memory starting and the switch SW5 for memory selection, which switches being provided on front face side of the reader means 60, so that the storing, reading out or erasing of the voice information with respect to the temporary memory means TM will be controlled practically by means of the operation of these switches SW4 and SW5.

Figure 20B:
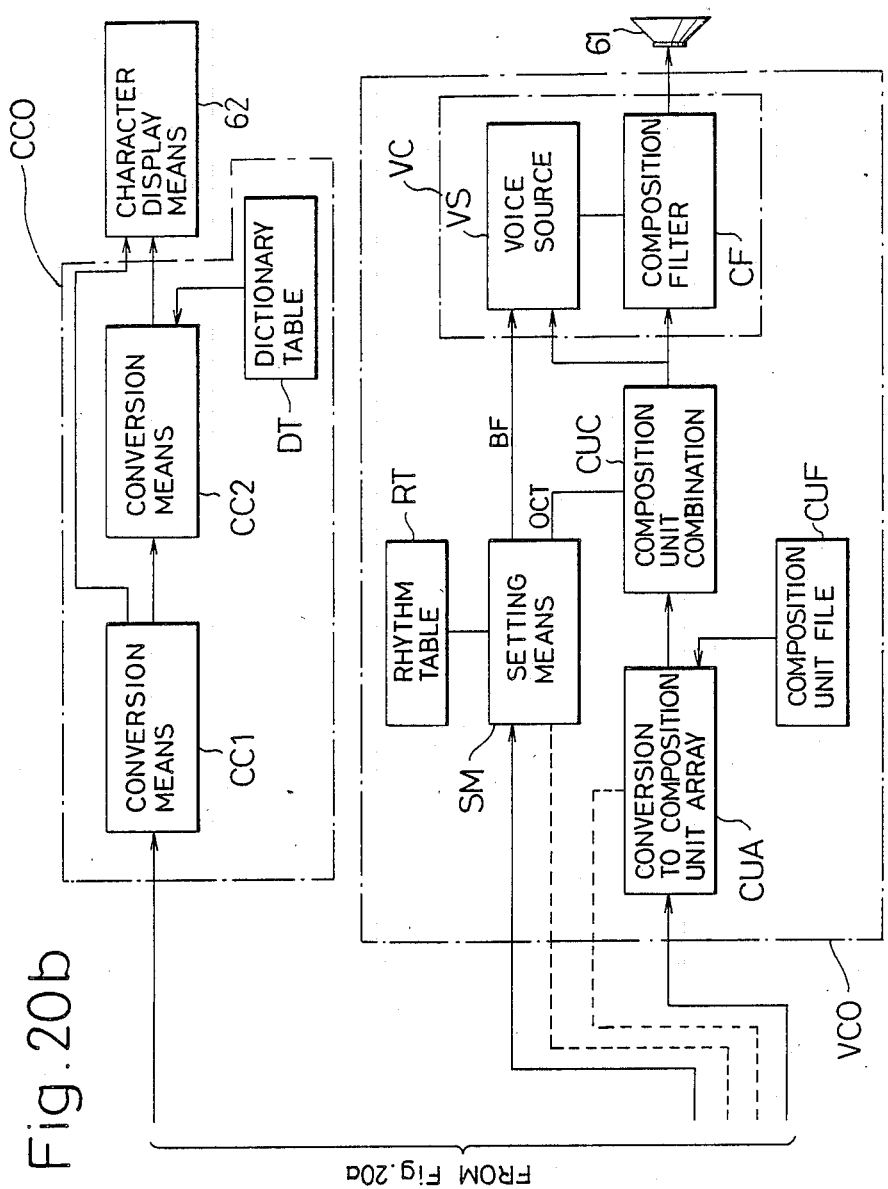
FIG. 20 as FIGS. 20a and 20b together make up illustrates how FIGS. 20a and 20b should be laid alongside each other is a block diagram showing detailed circuit arrangement of the learning assembly of FIG. 18.

Referring to the operation of the learning equipment of FIG. 18 by references also to FIG. 20, the user turns ON the source connecting switch PW and voice output operating switch SW1 and scans a bar code BC of a figure M in the text EB using the pen-type sensor 65, the voice composition means VCO prepares a composite unit array at a composition unit converting means on the basis of the phoneme branch number forming the voice information in the voice information read out of the bar code BC while comparing the information with a composition unit file CUF. The composition unit referred to here is to be set on the basis of the syllables in the respective languages, and such parameters as the formant parameter, linearly predicting coefficient and the like may be employed. At the voice composition means VCO, the basic frequency BF and amplitude/duration signal OCT are set at a setting means SM in comparison with a rhythm table RT based on the length, centroid pitch and centroid power of the phoneme branches forming the rhythm information of the voice information. In the composition unit array, the length and amplitude of the respective composition units are determined on the basis of a predetermined rule taking into consideration the phoneme coupling and in response to the amplitude and duration OCT of the respective phonemes, and the units are combined at a composition unit combining means CUC. The basic frequency BF is provided as a parameter to a voice source VS of a voice composer VC, together with the particular pcocessing information of the voice information, while the composition unit array is provided as a parameter to a composition filter CF of the voice composer VC forming simulated vocal, cords, whereby the voice composition is realized at the voice composer VC in accordance with a predetermined regularly composing process, and the composed voice is reproduced through a loudspeaker 61.

When, on a hand, the other character of one of the figures M in the text book EB other than that displayed is intended to be made known to the user, the output mode switch SW3 is operated for selecting the character conversion, the display output operation switch SW2 of the output operating means OP1 is turned on for carrying out the character conversion in comparison with a dictionary table DT by at least two conversion means CC1 and CC2 in the converting means CC0, and the converted character is displayed at the display means 62. When it is intended to repeatedly learn a knowledge once learned, the memory starting switch SW4 is turned on to have the voice information elements from the bar code BC sequentially stored. Thereafter, the memory selection switch SW5 is turned on for the repeated learning. In this case, the arrangement is so made that a desired figure can be selected depending on repeated number of turning on of the switch SW5, and it may be also possible to simultaneously realize the word display and the character display by means of a predetermined number of the turning on repeated.

Figure 21:
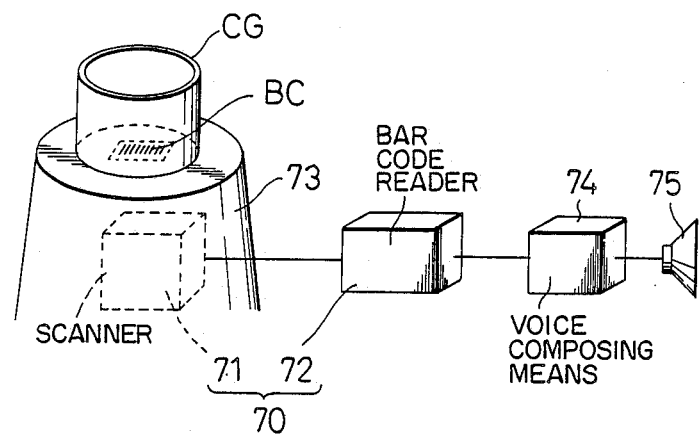
FIG. 21 is a schematic explanatory view for a blind-people use commodity-discriminating means according to the system of the present invention.

According to a still further remarkable feature of the present invention, the system can be utilized as a commodity discriminating assembly for use by weak-sighted and blind people. Referring to FIG. 21, the commodity discriminating assembly comprises a reader means 70 forming the voice response unit and capable of reading the bar code BC provided on a commodity CG as the voice encoding unit. The reader means 70 includes a scanner 71 and a bar code reader 72, while the scanner 71 is incorporated in a reader base 73 which is brought into direct contact with the commodity CG and the reader 72 is connected through a voice composing means 74 to a loudspeaker 75. The bar code BC provided on the commodity CG is formed preferably as the protuberances made for the bars to be palpable, or as a sticker type sheet member pasted on a projected land of the commodity CG. The user may hold the commodity CG to recognize by touching the position of the bar code BC and place the bar code on the reader means 70 to have the voice information provided thereto, and a common name and so on of the commodity CG can be notified through the loudspeaker 75.

Figure 22:
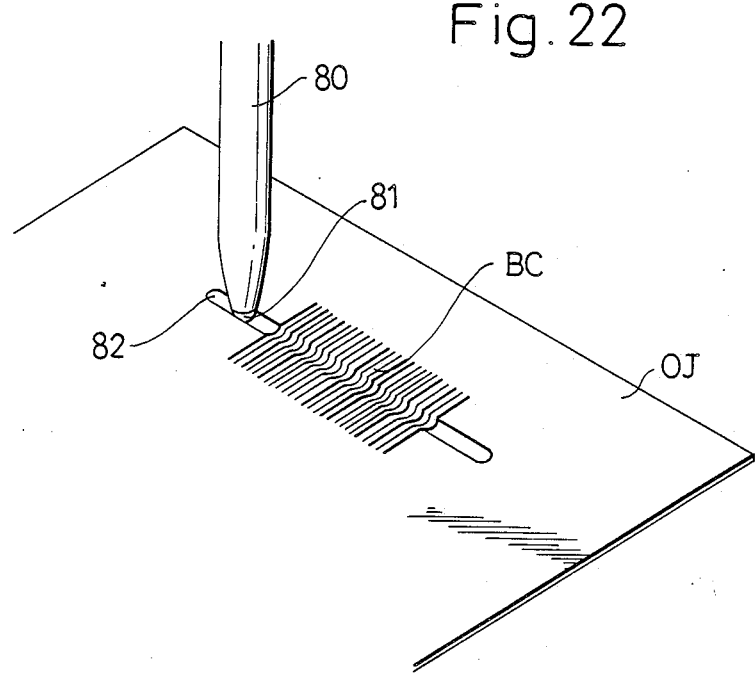
FIG. 22 is a schematic perspective view in another aspect of the reader means employed in the system of the present invention.

As shown in FIG. 22, alternatively, the bar code BC may be provided across a groove 82 made on a surface of the commodity or object OJ to have all bars of the code laid across the groove, so that the blind user can recognize by touching the position of the groove 82, a pen type reader means 80 will then be shifted along the groove 82 with a sensor tip 82 of the reader means 80 slid along the groove to have the bar code BC thereby scanned, and the commodity name and so on can be obtained in a vocal reproduction. The arrangement of the present embodiment should of course be effectively utilizable not only as a provision for use by blind people, but also as general educational equipments.

Figure 23:
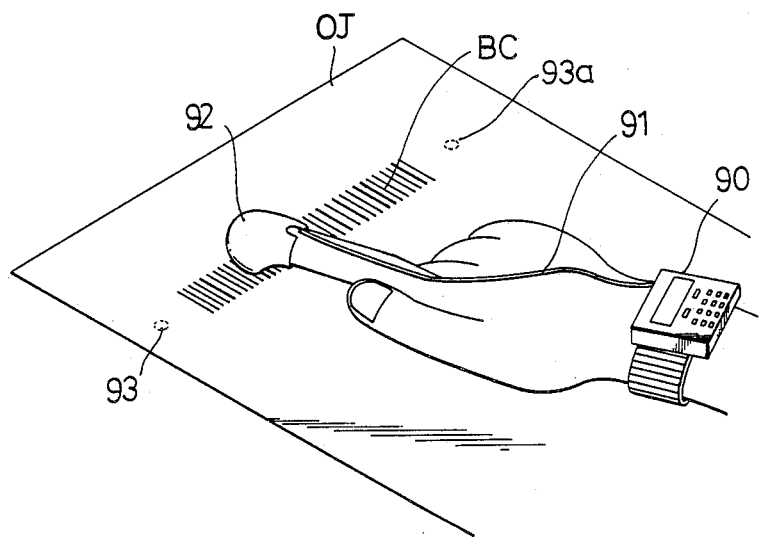
FIGS. 23 and 24 are explanatory views of still another aspect of the reader means.
Figure 24:
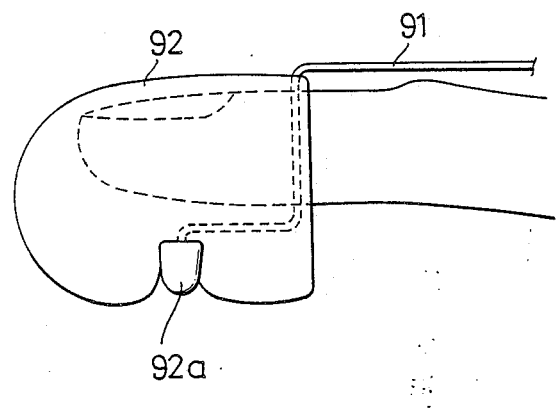

According to yet another feature of the present invention, a portable reader means can be provided. Referring to FIGS. 23 and 24, a reader means 90 in the present embodiment is provided in the form of, for example, a wristwatch which is connected through a lead wire 91 to a sensor 92 made in the form of a finger cap, and a lens 92a of such arrangement as any one of the embodiments shown in FIGS. 5-8 is provided on inner side of the sensor 92 to be normally brought into contact with the bar code BC on an object OJ as fitted to, for example, a pointing finger tip. In the reader means 90, a loudspeaker should be incorporated for the vocal reproduction of the bar code information. Further, there may be provided on both sides in scanning direction of the bar code BC, for example, a pair of protuberances 93 and 93a, so that the blind user may recognize by touching these protuberances 93 and 93a the position of the bar code and may have the bar code information scanned by the sensor 92 on the finger top to obtain the vocally reproduced information which can be of not only the commodity but also any of various matters given as printed in the bar code.

Since the sensor 92 at the user's finger top of the reader means 90 shown in FIGS. 23 and 24 is to be accurately brought into engagement with the bar code with the user's finger control, any erroneous operation can be minimized, and the reader means can be utilized by any people of no physical handicap as a part of POS system. When the assembly of the present embodiment is employed for educational purpose, further, it may be possible to render the trainee to feel more familiar with the text book since the book is to be touched by finger tips for tracing the bar code.

What is claimed as our invention is:

1. An encoding and composing system for generating voice from text, the system comprising:
   (a) a voice encoding unit for text, said voice encoding unit including:
      (i) means for obtaining text data as an input for the text,
      (ii) a composition analysis means which receives the text data from said text data input means and generates from the text data rhythm information and phonemic information, and
      (iii) means connected to receive the prosody and phonemic information for encoding the information as voice data and for writing the encoded voice data;
   (b) an encoded voice data storing means including an integrated circuit (IC) card separated from but associatable with said voice encoding unit, said encoding and writing means of said voice encoding unit writing into said storing means the encoded voice data when the storing means is associated with the voice encoding unit; and
   (c) a voice response unit separate from said voice encoding unit and associatable with said storing means for composing, when associated, said voice of said text from the stored encoded voice data, said voice response unit including:
      (i) a control information generating means for reading from said storing means the encoded voice data to decode therefrom the phonemic and prosody information and generating therefrom control information, and
      (ii) a voice composition means responsive to said control information for composing the voice from the control information.

2. A system according to claim 1 wherein the stored encoded voice data is a bar code.

3. A system according to claim 2 wherein said bar code is a representation of at least each of narrow and wide bars and narrow and wide spaces, the bar code representing a number of data bits 1 less than the total number of said bars and spaces.

4. A system according to claim 3 wherein said bar code includes a narrow bar at a terminating position the width of the last-positioned bar may be positively determined.

5. A system according to claim 2 wherein said means for storing the encoded voice data is a language dictionary in which said bar codes are provided for respective words contained in said dictionary.

6. A system according to claim 2 wherein said voice encoding unit is in the form of a picture book including a plurality of picture figures and a plurality of said bar codes provided respectively encoded with words corresponding to said figures, and said voice response unit further includes a reader means for reading said bar codes and having means for displaying each of said words read out by said reader means.

7. A system according to claim 6 wherein said reader means is further provided with a memory means.

8. A system according to claim 1 wherein said control information generating means includes a reader means having a sensor which comprises a lens, a light emitting element embedded in said lens, an optical fiber having a front and a rear end passed through said lens to position the front end at least adjacent a surface of the lens, and a light receiving element connected to the rear end of said optical fiber wherein the reader means scans said information store means optically to produce the control information and is connected to supply the control information to said voice composition means.

9. A system according to claim 8 wherein said tip end of said optical fiber is sharpened.

10. A system according to claim 8 wherein said sensor further comprises a bead of a glass material and fitted to said tip end of said optical fiber.

11. A system according to claim 8 wherein said light receiving element is also embedded in said lens.

12. A system according to claim 1 wherein said information store means includes a bar code provided on commodities.

13. A system according to claim 12 wherein said bar code is provided on a projected land of said commodities.

14. A system according to claim 12 wherein said bar code is provided along a groove made in a surface of said commodities so that bars and spaces forming the bar code will lie across said groove, and said voice response unit further includes a bar code reader means having a sensor capable of scanning the bar code along the groove.

* * * * *

UNITED STATES PATENT AND TRADEMARK OFFICE
CERTIFICATE OF CORRECTION

PATENT NO. : 4,964,167

DATED : October 16, 1990

INVENTOR(S) : Kunizawa et al.

It is certified that error appears in the above-identified patent and that said Letters Patent is hereby corrected as shown below:

ON TITLE PAGE:

In item [75] add inventor --Etsuji Fujio--.

Column 12, line 4, after "position" insert --whereby--.

Column 12, line 46, change "12" to --13--.

Signed and Sealed this

Thirty-first Day of March, 1992

Attest:

HARRY F. MANBECK, JR.

Attesting Officer          Commissioner of Patents and Trademarks